United States Patent
Siomina et al.

(10) Patent No.: US 12,470,961 B2
(45) Date of Patent: Nov. 11, 2025

(54) ENHANCED PROCEDURE FOR EARLY MEASUREMENT REPORTING

(71) Applicant: Telefonaktiebolaget LM Ericsson (publ), Stockholm (SE)

(72) Inventors: Iana Siomina, Täby (SE); Muhammad Ali Kazmi, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 319 days.

(21) Appl. No.: 17/764,796

(22) PCT Filed: Sep. 30, 2020

(86) PCT No.: PCT/SE2020/050918
§ 371 (c)(1),
(2) Date: Mar. 29, 2022

(87) PCT Pub. No.: WO2021/066715
PCT Pub. Date: Apr. 8, 2021

(65) Prior Publication Data
US 2022/0345926 A1 Oct. 27, 2022

Related U.S. Application Data

(60) Provisional application No. 62/910,211, filed on Oct. 3, 2019.

(51) Int. Cl.
*H04W 72/04* (2023.01)
*H04W 24/10* (2009.01)
(Continued)

(52) U.S. Cl.
CPC ........... *H04W 24/10* (2013.01); *H04W 76/20* (2018.02)

(58) Field of Classification Search
CPC . H04W 24/10; H04W 76/20; H04W 36/0085; H04W 36/0058; H04W 36/0069
(Continued)

(56) References Cited

U.S. PATENT DOCUMENTS

2016/0192304 A1   6/2016   Yi et al.
2019/0150014 A1*  5/2019   Virtej ............... H04W 76/27
                                                    370/329
(Continued)

FOREIGN PATENT DOCUMENTS

CN    101557615 A  * 10/2009
CN    109309969 A    2/2019
(Continued)

OTHER PUBLICATIONS

Ericsson (R2-1910290, Aug. 26-30, 2019, Summary of email discussion[106#37][NR/DCCA]: UE behaviour regarding idle measurement configurations and measurement results) (Year: 2019).*

(Continued)

*Primary Examiner* — Maharishi V Khirodhar
(74) *Attorney, Agent, or Firm* — Weisberg I.P. Law, P.A.

(57) ABSTRACT

A method, system and apparatus are disclosed. According to one or more embodiments, a wireless device configured to communicate with a network node is provided. The wireless device configured to: before expiration of a first timer, perform first measurements of a cell while meeting a first performance target, and after the first timer has stopped, perform second measurements of the cell while meeting a second performance target different from the first performance target.

22 Claims, 9 Drawing Sheets

(51) Int. Cl.
*H04W 76/00* (2018.01)
*H04W 76/20* (2018.01)
*H04W 88/08* (2009.01)

(58) Field of Classification Search
USPC .......................................................... 370/329
See application file for complete search history.

(56) References Cited

U.S. PATENT DOCUMENTS

2020/0314674 A1* 10/2020 Xu ..................... H04W 24/10
2022/0131584 A1* 4/2022 Dalsgaard ............ H04B 7/0626

FOREIGN PATENT DOCUMENTS

| CN | 109644355 A | 4/2019 | |
|---|---|---|---|
| EP | 1587335 A1 * | 10/2005 | ...... H04W 36/00835 |
| WO | 2019096888 A1 | 5/2019 | |
| WO | 2019137227 A1 | 7/2019 | |

OTHER PUBLICATIONS (R2-1905543, UE behaviours in NR early measurements, May 13-17, 2019) (Year: 2019).*
International Search Report and Written Opinion dated Dec. 9, 2020 for International Application No. PCT/SE2020/050918 filed Sep. 30, 2020, consisting of 11 pages.
3GPP TS 37.340 V15.7.0; 3rd Generation Partnership Project; Technical Specification Group Radio Access Network; Evolved Universal Terrestrial Radio Access (E-UTRA) and NR; Multi-connectivity; Stage 2 (Release 15); Sep. 2019, consisting of 70 pages.
3GPP TS 36.133 V16.2.0; 3rd Generation Partnership Project; Technical Specification Group Radio Access Network; Evolved Universal Terrestrial Radio Access (E-UTRA); Requirements for support of radio resource management (Release 16); Jun. 2019, consisting of 3391 pages.
3GPP TSG-RAN WG2#107 R2-1910290; Title: Summary of email discussion[106#37][NR/DCCA]: UE behaviour regarding idle measurement configurations and measurement results; Agenda Item: 11.10.3; Source: Ericsson (Rapporteur); Document for: Discussion, Decision; Location and Date: Prague, Czech Republic, Aug. 26-30, 2019, consisting of 30 pages.
3GPP TSG-RAN WG2 Meeting #107 R2-1908898; Title: Considerations on Outdated Early Measurement Results; Source: CATT; Agenda Item: 11.10.3; Document for: Discussion and Decision; Location and Date: Prague, Czech Republic, Aug. 26-30, 2019, consisting of 4 pages.
3GPP TS 36.331 V14.12.0; 3rd Generation Partnership Project; Technical Specification Group Radio Access Network; Evolved Universal Terrestrial Radio Access (E-UTRA); Radio Resource Control (RRC); Protocol specification (Release 14); Sep. 2019, consisting of 783 pages.
Chinese Office Action and English Summary dated Oct. 19, 2024 for Application No. 202080069340.3 consisting of13 pages.
Indian Office Action dated Aug. 29, 2022 for Patent Application No. 202247024923, consisting of 6-pages.

* cited by examiner

ENHANCED PROCEDURE FOR EARLY MEASUREMENT REPORTING

CROSS-REFERENCE TO RELATED APPLICATIONS

This application is a Submission Under 35 U.S.C. § 371 for U.S. National Stage Patent Application of International Application No.: PCT/SE2020/050918, filed Sep. 30, 2020 entitled "ENHANCED PROCEDURE FOR EARLY MEASUREMENT REPORTING," which claims priority to U.S. Provisional Application No. 62/910,211, filed Oct. 3, 2019, entitled "ENHANCED PROCEDURE FOR EARLY MEASUREMENT REPORTING IN NR," the entireties of both of which are incorporated herein by reference.

TECHNICAL FIELD

The present disclosure relates to wireless communications, and in particular, to procedures for measurements and/or reporting such as in early measurement reporting.

BACKGROUND

Multi-Carrier Operation with New Radio (NR, Also Referred to as $5^{th}$ Generation (5G))

NR carrier aggregation (CA) and MR-DC (Multi-Radio Dual Connectivity, including NR-DC, E-UTRAN New Radio (EN)-DC, and NR-E-UTRA (NE)-DC) are examples of multi-carrier operation with NR. In the Third Generation Partnership Project (3GPP, a standardization organization) standards, MR-DC is Dual Connectivity between E-UTRA and NR nodes, or between two NR nodes, as defined in Third Generation Partnership Projection (3GPP) standards such as in 3GPP Technical Specification (TS) 37.340.

Early Measurement Reporting
Long Term Evolution (LTE)

In LTE, early measurement reporting was introduced for Radio Resource Control (RRC)_IDLE state on Evolved Universal Terrestrial Radio Access (E-UTRA) carrier/cell level. The wireless device (capable of early measurement reporting) is configured with the early measurements (i.e., performing early measurements) via dedicated signaling in RRC Release message or System Information Block Type 5 (SIB5) broadcast where such measurements are performed by the wireless device in RRC_IDLE state. The wireless device knows that a cell supports early measurement reporting via a cell support indication in System Information Block Type 2 (SIB2).

Validity area configuration may be optional. The wireless device indicates measurement availability for early measurement reporting in Message 5 (Msg5) RRC signaling. The early measurement reporting occurs when the wireless device is in RRC_CONNECTED state and is implemented through UEInformationRequest/-Response messaging.

The wireless device is provided with carrier frequencies list and performed such measurements for each entry in measIdleCarrierListEUTRA, provided the wireless device supports carrier aggregation between serving carrier and the carrier frequency and bandwidth indicated by carrierFreq and allowedMeasBandwidth within the corresponding entry, otherwise (e.g., not supported combination), the carrier frequency may not be applicable for idle mode measurement reporting.

If the wireless device is provided with the cell list for such measurements, then the wireless device may consider the serving cell and cells identified by each entry within the measCellList to be applicable for idle mode measurement reporting, otherwise the wireless device will consider the serving cell and up to maxCellMeasIdle as the strongest identified cells whose Reference Signal Received Power (RSRP)/Reference Signal Received Quality (RSRQ) measurement results are above the value(s) provided in qualityThreshold (if any) to be applicable for such measurements.

A duration timer T331 (10-300 seconds) was introduced, which is provided to the wireless device via dedicated RRC signaling. If T331 expires or is stopped, the wireless device releases the dedicated configuration for such measurements, but it is up to wireless device implementation whether to continue such measurements according to SIB5 configuration after T331 has expired or stopped. As described in 3GPP standards such as 3GPP TS 36.133: while T331 is running, the wireless device may perform such measurements on the configured overlapping and non-overlapping inter-frequency carriers; in the absence or expiration of T331, it is up to wireless device implementation to perform such measurements. This arrangement is illustrated in FIG. 1 that is a signaling diagram of early measurement reporting in LTE.

NR

In 3GPP Release 16 (3GPP Rel-16), early measurement reporting is introduced for measurements on E-UTRA and NR carriers to facilitate multi-carrier operation with NR, e.g., NR CA or MR-DC. The measurements can be performed in RRC_IDLE or RRC_INACTIVE. A measurement report may be sent as early as possible, but may not be allowed to send information that can be used to determine wireless device location before security activation, implying that the wireless device coming from RRC_IDLE can send after SecurityModeCommand or, that the wireless device coming from RRC_IDLE with stored context (LTE 3GPP Release 13 (Rel-13)) can send, after processing, the RRC Resume message, and the wireless device coming from NR RRC_INACTIVE can send after transmission of the RRC Resume Request message (i.e., before reception of the RRC Resume message). In Option 1, the wireless device sends a request immediately after the SecurityModeCommand, and in Option 2, the wireless device sends the request after the RRCConnectionReconfigurationComplete/RRCReconfigurationComplete message as illustrated in FIG. 2 that is a signaling diagram of early measurement reporting from NR RRC_IDLE.

For RRC_INACTIVE, in Option 1, UEInformationRequest/Response can be used after resuming to request inactive mode measurements, and in Option 2, the network node can request inactive measurements in RRCResume, and the wireless device then reports early measurements in RRCResumeComplete as illustrated in FIG. 3 that is a signaling diagram of early measurement reporting from NR RRC_INACTIVE.

However, these existing schemes suffer from one or more problems, including but not limited to the one or more problems listed below.

Problem 1: For early measurement reporting, the wireless device is configured with timer T331, which may be up to, e.g., 300 seconds (5 minutes), during which the wireless device is required to perform measurements for early measurement reporting. There is no strict relation between when the timer expires and when the measurements are reported. The wireless device may not be able to report the measurements while the timer is running or even shortly after the timer expires, which may result in reporting of too old measurements which is not useful for fast CA configuration (which may be one of the original purposes of early measurement reporting).

Problem 2: Some wireless devices may even continue performing measurements (not required but not prohibited either) after the timer T331 expires. When a wireless device may be performing these measurements, it is not clear when the measurement was actually performed, e.g., while the timer T331 was running or after it expired. Also, the wireless device may indicate to the network node the measurements availability for early measurement reporting, but the network node may not be aware of how old the measurements are and/or whether it may be worth it to the network node to request those measurements.

Problem 3: Generally, a cell (that may be provided by a network node) is known to the wireless device for 5 seconds after the cell signals have been measured. If more than 5 seconds elapsed, the wireless device may need to identify the cell first prior to performing measuring/measurements on that cell (i.e., on signals from the cell) in order to guarantee measurement performance. The maximum value of timer T331 is far longer than 5 seconds, which may result in that the wireless device may be measuring unknown cell(s) which in turn may result in poor measurement quality or, in some cases, measurements of a wrong cell.

SUMMARY

Some embodiments advantageously provide methods, systems, network nodes and wireless devices for procedures for measurements and/or reporting such as in early measurement reporting.

Wireless device and network node embodiments are described herein. In one or more embodiments, methods in the wireless device for timer-adaptive procedure for early measurement reporting (EMR) measurements are described. In one or more embodiments, methods in the wireless device for timer-adaptive procedure for EMR measurements which further account for the known/unknown status of the cell or beam to be measured for EMR purpose are described. In one or more embodiments, methods in a network node a described.

The one or more embodiments described herein may advantageously provide one or more of the following:
  Consistent wireless device behavior and EMR measurements performance in different phases of the EMR measurement procedure;
  Controlling EMR measurements during a time gap after the T331 timer stopped until the wireless device gets a possibility to report EMR measurements, which may be crucial for enabling early multi-carrier configuration for the wireless device
  Possibility to differentiate between the EMR measurements during the T331 and the measurements before reporting While some embodiments may be described with respect to EMR measurements, the teachings described herein are equally applicable to other measurements such as other measurements that may be performed during a time period described herein.

According to one aspect of the disclosure, a wireless device configured to communicate with a network node is provided. The wireless device is configured to: before expiration of a first timer, perform first measurements of a cell while meeting a first performance target; and after the first timer has stopped, perform second measurements of the cell while meeting a second performance target different from the first performance target.

According to one or more embodiments of this aspect, wherein the wireless device is further configured to at least one of: indicate an availability of a report of at least one of the first measurements and second measurements; and transmit the report of the at least one of the first measurements and second measurements. According to one or more embodiments of this aspect, the wireless device is further configured to determine at least one of the first measurements and second measurements to include in the report based at least in part on an elapsed time from when at least one of the first measurements and second measurements were performed. According to one or more embodiments of this aspect, the report indicates when the second measurements were performed.

According to one or more embodiments of this aspect, the second performance target is less stringent than the first performance target. According to one or more embodiments of this aspect, the second performance target that is less stringent than the first performance target corresponds to one of: at least one of less carriers, less cells and less beams to measure at a time compared to the first performance target; less frequent sampling compared to the first performance target; less accurate measurements compared to the first performance target; and greater measurement period compared to the first performance target. According to one or more embodiments of this aspect, the first performance target and the second performance target correspond to at least one requirement of one of a same type of signal and based on the same type of signal. According to one or more embodiments of this aspect, the at least one requirement of the same type includes at least one of an accuracy requirement, measurement period requirement, evaluation period requirement, a number of samples requirement, sampling periodicity requirement and radio condition requirement.

According to one or more embodiments of this aspect, the first measurements and the second measurements of a cell includes at least one measurement on at least one of: at least one beam and at least one transmit direction of the cell, According to one or more embodiments of this aspect, performing of the second measurements of the cell includes at least one of: completing the second measurements after the first timer has stopped; taking all measurement samples after the first timer has stopped; and taking at least one measurement before the first timer has stopped and at least one measurement sample after the first timer has stopped. According to one or more embodiments of this aspect, the stopping of the first timer corresponds to an expiration of the first timer; and the second measurements being performed at least one of: before expiration of a second timer different from the first timer; and within a predefined time period after the first timer stopped. According to one or more embodiments of this aspect, the first and second measurements are performed on the same type of signal of the cell.

According to another aspect of the disclosure, a network node configured to communicate with a wireless device is provided. The network node is configured to: receive at least one of: an indication of an availability of a report of at least one of first measurements of a cell and second measurements of the cell, and a report including the at least one of the first measurements and second measurements. The first measurements having been performed by the wireless device before expiration of a first timer and while a first performance target was met, and the second measurements having been performed by the wireless device after the first timer has stopped and while a second performance target was met. According to one or more embodiments of this aspect, the first measurements and second measurements are included in the report based at least in part on an elapsed time from when at least one of the first measurements and second measurements were performed.

According to one or more embodiments of this aspect, the second performance target is less stringent than the first performance target. According to one or more embodiments of this aspect, the second performance target that is less stringent than the first performance target corresponds to one of: at least one of less carriers, less cells and less beams to measure at a time compared to the first performance target; less frequent sampling compared to the first performance target; less accurate measurements compared to the first performance target; and greater measurement period compared to the first performance target. According to one or more embodiments of this aspect, the report indicates when the second measurements were performed.

According to one or more embodiments of this aspect, the first performance target and the second performance target correspond to at least one requirement of a same type. According to one or more embodiments of this aspect, the at least one requirement of the same type includes at least one of an accuracy requirement, measurement period requirement, evaluation period requirement, a number of samples requirement, sampling periodicity requirement and radio condition requirement. According to one or more embodiments of this aspect, the first measurements and the second measurements of the cell includes at least one measurement on at least one of: at least one beam and at least one transmit direction of the cell. According to one or more embodiments of this aspect, the performed second measurements of the cell includes at least one of: completing the second measurements after the first timer has stopped; taking all measurement samples after the first timer has stopped; and taking at least one measurement before the first timer has stopped and at least one measurement sample after the first timer has stopped.

According to one or more embodiments of this aspect, the stopping of the first timer corresponds to an expiration of the first timer; and the second measurements were performed at least one of: before expiration of a second timer different from the first timer; and within a predefined time period after the first time stopped. According to one or more embodiments of this aspect, the first and second measurements are performed by the wireless device on the same type of signal of the cell.

According to another aspect of the disclosure, a method implemented by a wireless device that is configured to communicate with a network node is provided. Before expiration of a first timer, first measurements of a cell are performed while meeting a first performance target. After the first timer has stopped, second measurements of the cell are performed while meeting a second performance target different from the first performance target.

According to one or more embodiments of this aspect, at least one of: an availability of a report of at least one of the first measurements and second measurements is indicated, and the report of the at least one of the first measurements and second measurements is transmitted. According to one or more embodiments of this aspect, at least one of the first measurements and second measurements to include in the report is determined based at least in part on an elapsed time from when at least one of the first measurements and second measurements were performed. According to one or more embodiments of this aspect, the report indicates when the second measurements were performed.

According to one or more embodiments of this aspect, the second performance target is less stringent than the first performance target. According to one or more embodiments of this aspect, the second performance target that is less stringent than the first performance target corresponds to one of: at least one of less carriers, less cells and less beams to measure at a time compared to the first performance target; less frequent sampling compared to the first performance target; less accurate measurements compared to the first performance target; and greater measurement period compared to the first performance target. According to one or more embodiments of this aspect, the first performance target and the second performance target correspond to at least one requirement of one of a same type of signal and based on the same type of signal.

According to one or more embodiments of this aspect, the at least one requirement of the same type includes at least one of an accuracy requirement, measurement period requirement, evaluation period requirement, a number of samples requirement, sampling periodicity requirement and radio condition requirement. According to one or more embodiments of this aspect, the first measurements and the second measurements of the cell includes at least one measurement on at least one of: at least one beam and at least one transmit direction of the cell. According to one or more embodiments, performing of the second measurements of the cell includes at least one of: completing the second measurements after the first timer has stopped; taking all measurement samples after the first timer has stopped; and taking at least one measurement before the first timer has stopped and at least one measurement sample after the first timer has stopped. According to one or more embodiments of this aspect, the stopping of the first timer corresponds to an expiration of the first timer; and the second measurements are performed one of: before expiration of a second timer different from the first timer; and within a predefined time period after the first timer stopped. According to one or more embodiments of this aspect, the first and second measurements are performed on the same type of signal of the cell.

According to another aspect of the disclosure, a method implemented by a network node that is configured to communicate with a wireless device is provided. At least one of the following are received: an indication of an availability of a report of at least one of first measurements of a cell and second measurements of the cell, and a report including the at least one of the first measurements and second measurements. The first measurements having been performed by the wireless device before expiration of a first timer and while a first performance target was met, and the second measurements having been performed by the wireless device after the first timer has stopped and while a second performance target was met.

According to one or more embodiments of this aspect, the first measurements and second measurements are included in the report based at least in part on an elapsed time from when at least one of the first measurements and second measurements were performed. According to one or more embodiments of this aspect, the second performance target is less stringent than the first performance target. According to one or more embodiments of this aspect, the second performance target that is less stringent than the first performance target corresponds to one of: at least one of less carriers, less cells and less beams to measure at a time compared to the first performance target; less frequent sampling compared to the first performance target; less accurate measurements compared to the first performance target; and greater measurement period compared to the first performance target.

According to one or more embodiments of this aspect, the report indicates when the second measurements were performed. According to one or more embodiments of this aspect, the first performance target and the second performance target correspond to at least one requirement of a same type. According to one or more embodiments of this aspect, the at least one requirement of the same type includes at least one of an accuracy requirement, measurement period requirement, evaluation period requirement, a number of samples requirement, sampling periodicity requirement and radio condition requirement.

According to one or more embodiments of this aspect, the first measurements and the second measurements of the cell includes at least one measurement on at least one of: at least one beam and at least one transmit direction of the cell. According to one or more embodiments, the performed second measurements of the cell includes at least one of: completing the second measurements after the first timer has stopped; taking all measurement samples after the first timer has stopped; and taking at least one measurement before the first timer has stopped and at least one measurement sample after the first timer has stopped According to one or more embodiments of this aspect, the stopping of the first timer corresponds to an expiration of the first timer; and the second measurements were performed at least one of: before expiration of a second timer different from the first timer; and within a predefined time period after the first time stopped. According to one or more embodiments of this aspect, the first and second measurements are performed by the wireless device on the same type of signal of the cell.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
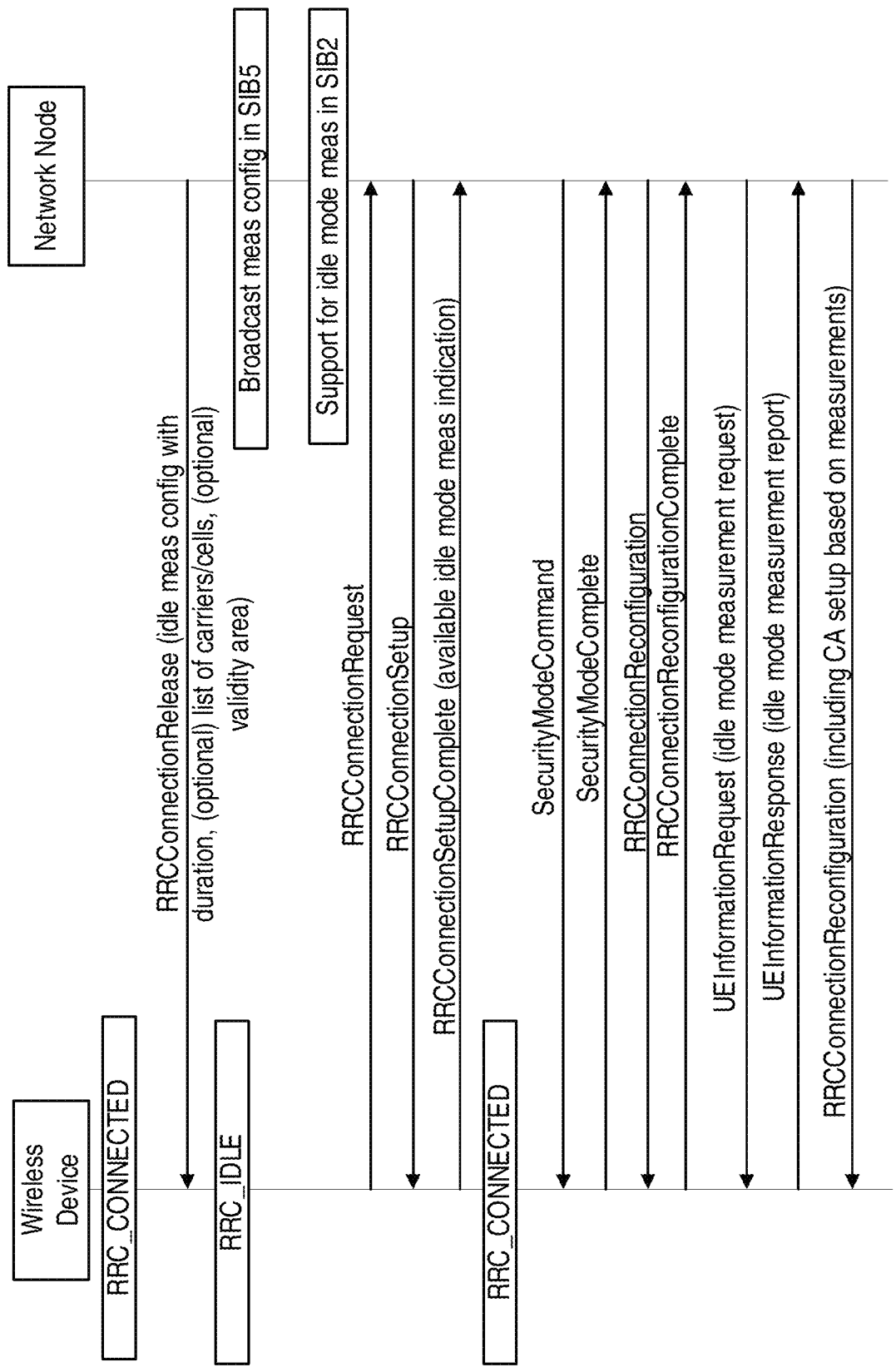
FIG. 1 is a signaling diagram of an example of early measurement reporting in Long Term Evolution (LTE)
Figure 2:
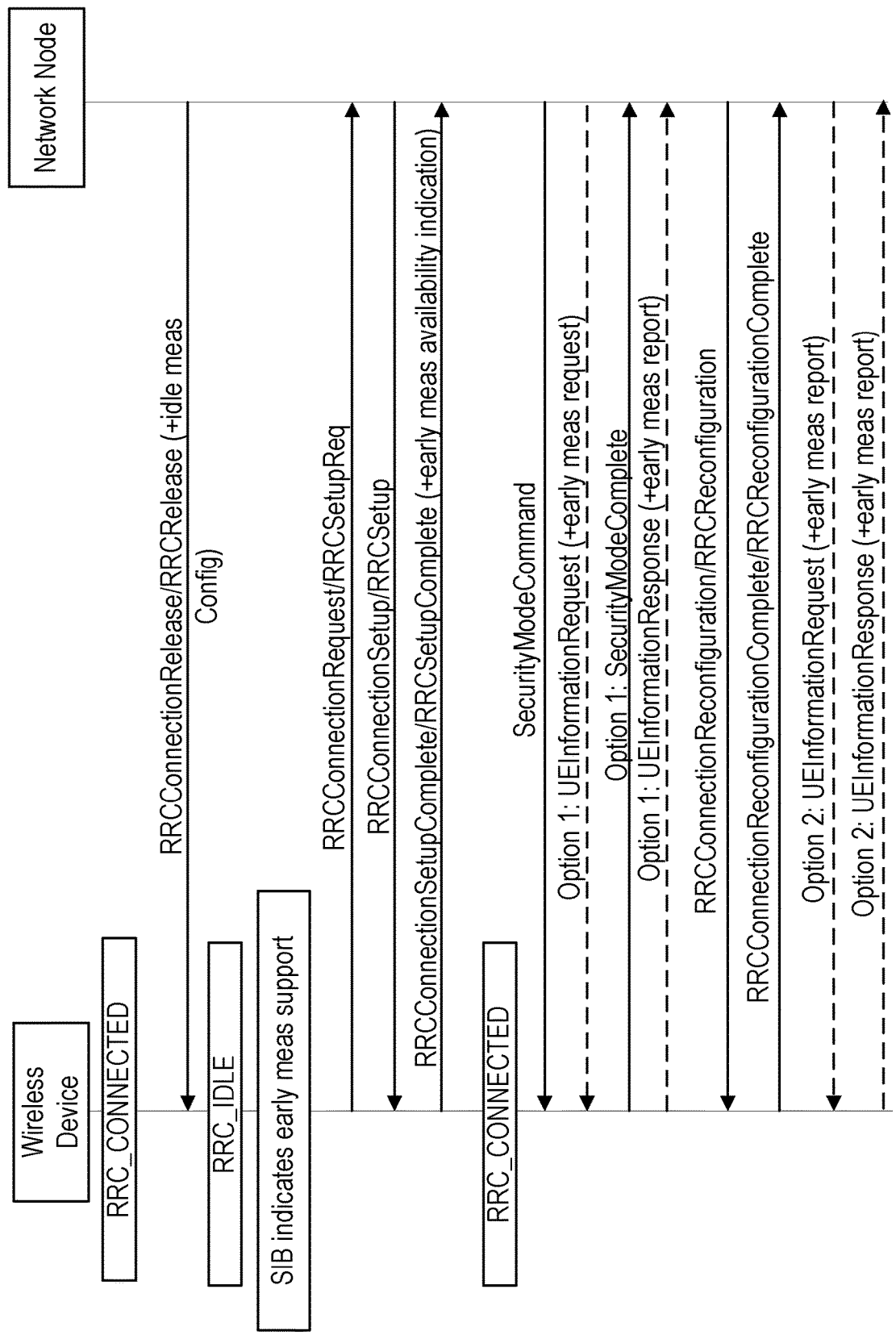
FIG. 2 is a signaling diagram of an example of early measurement reporting from NR RRC_IDLE.
Figure 3:
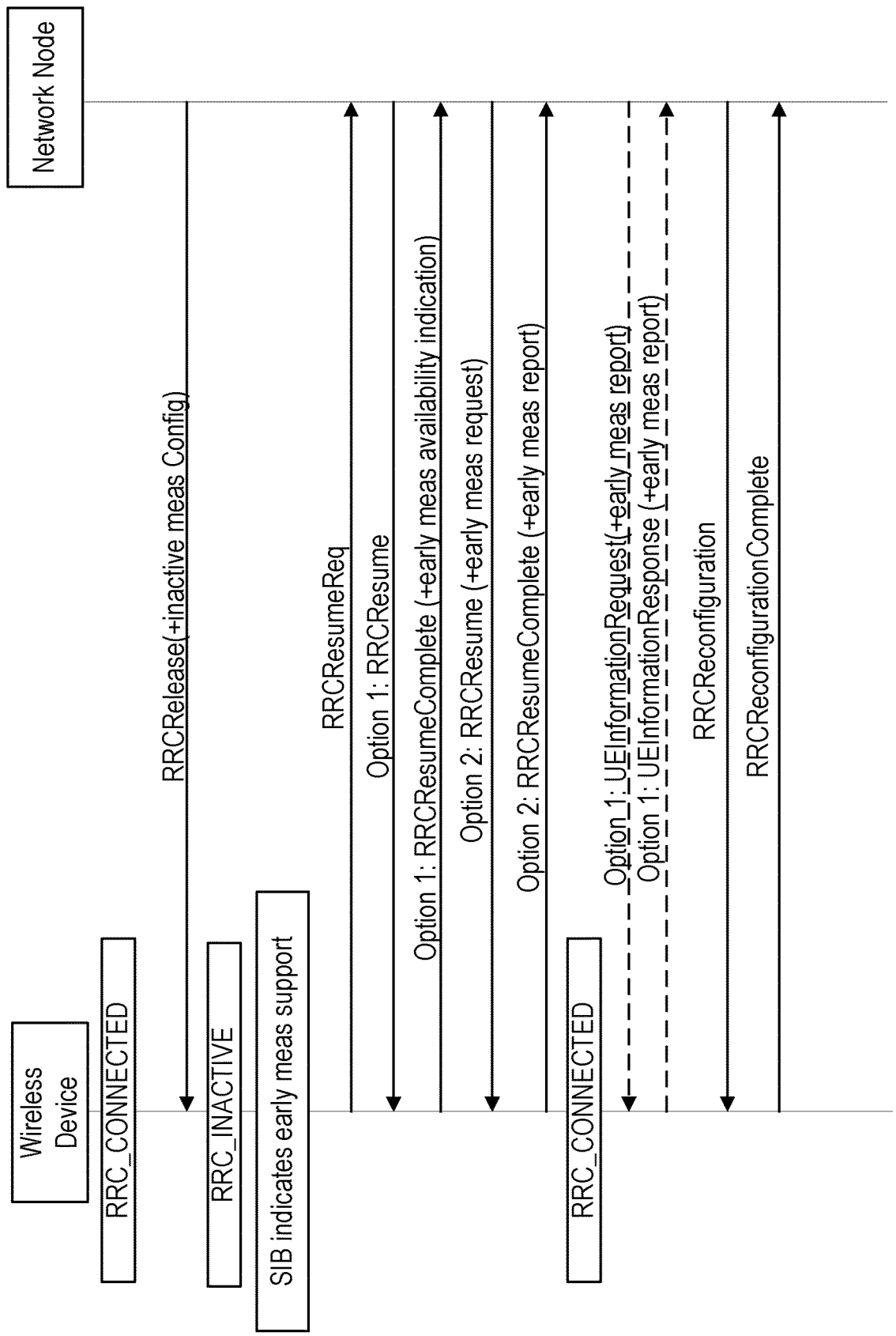
FIG. 3 is a signaling diagram of an example of early measurement reporting from NR RRC_INACTIVE.

Before describing in detail exemplary embodiments, it is noted that the embodiments reside primarily in combinations of apparatus components and processing steps related to procedures for measurements such as early measurement reporting measurements. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/ multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term time resource used herein may correspond to any type of physical resource or radio resource expressed in terms of length of time or time interval or time duration. Examples of time resources are: symbol, mini-slot, time slot, subframe, radio frame, TTI, interleaving time, etc.

The term Transmission Time Interval (TTI) used herein may correspond to any time period over which a physical channel can be encoded and interleaved for transmission. The physical channel is decoded by the receiver over the same time period (T0) over which it was encoded. The TTI may also interchangeably called as short TTI (sTTI), transmission time, slot, sub-slot, mini-slot, short subframe (SSF), mini-subframe, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or configuration for EMR. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to NR, 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering, e.g., a subframe or slot or symbol, and/or in the same time-frequency resource structure like a resource block. A resource element may represent a smallest time-frequency resource, e.g., representing the time and frequency range covered by one symbol or a number of bits represented in a common modulation. A resource element may, e.g., cover a symbol time length and a subcarrier, in particular in NR, 3GPP and/or LTE standards. A data transmission may represent and/or pertain to transmission of specific data, e.g., a specific block of data and/or transport block. Generally, demodulation reference signaling may comprise and/or represent a sequence of signals and/or symbols, which may identify and/or define the demodulation reference signaling.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The embodiments are described for multi-carrier operation with NR, including intra-RAT multi-carrier operation and inter-RAT multi-carrier operation (e.g., EN-DC or NE-DC). However the embodiments are applicable to earlier measurement reporting with any other single-RAT or multi-RAT systems, where a UE receives and/or transmit signals (e.g., data) e.g., NR, LTE FDD/TDD, WCDMA/HSPA, WiFi, WLAN, LTE, 5G, etc.

Embodiments provide procedures for measurements and/or reporting such as in early measurement reporting.

Figure 4:
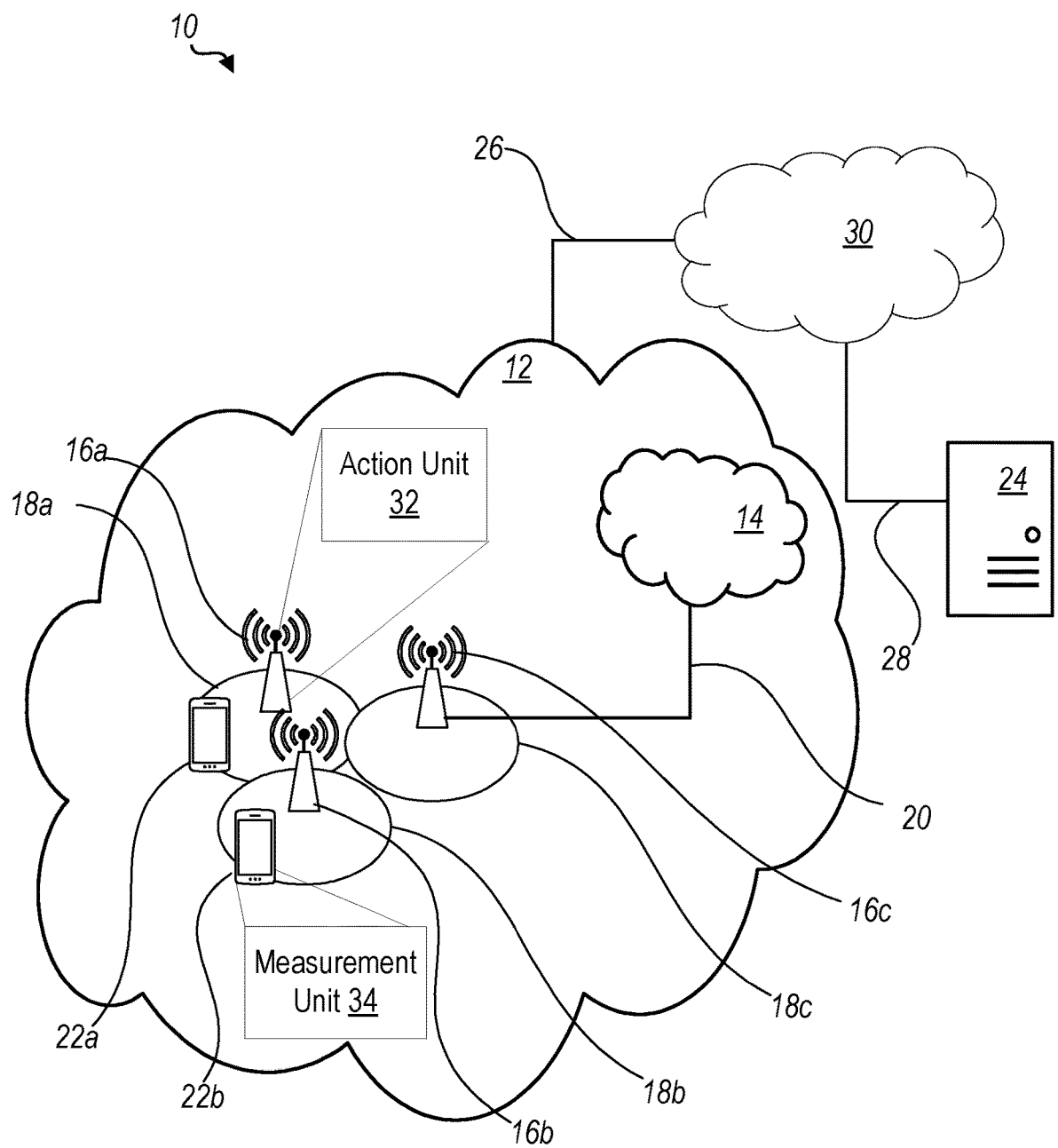
FIG. 4 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an action unit 32 which is configured to perform one or more network node 16 functions as described herein such as with respect to procedures for measurements and/or reporting such as in early measurement reporting. A wireless device 22 is configured to include a measurement unit 34 which is configured to perform one or more wireless device 22 functions as described herein such as with respect to procedures for measurements and/or reporting such as in early measurement reporting.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, determine, relay, forward, transmit, receive, communicate, store, process, etc., information related to procedures for measurements and/or reporting such as in early measurement reporting that are described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include action unit 32 configured to perform one or more network node 16 functions as described herein such as with respect to procedures for measurements and/or reporting such as in early measurement reporting. For example, a network node 16 being configured to perform one or more functions may correspond to processing circuitry 68 being configured to perform one or more functions, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a measurement unit 34 configured to perform one or more wireless device 22 functions as described herein such as with respect to procedures for measurements and/or reporting such as in early measurement reporting. For example, a WD 22 being configured to perform one or more functions may correspond to processing circuitry 84 being configured to perform one or more functions, as described herein.

Figure 5:
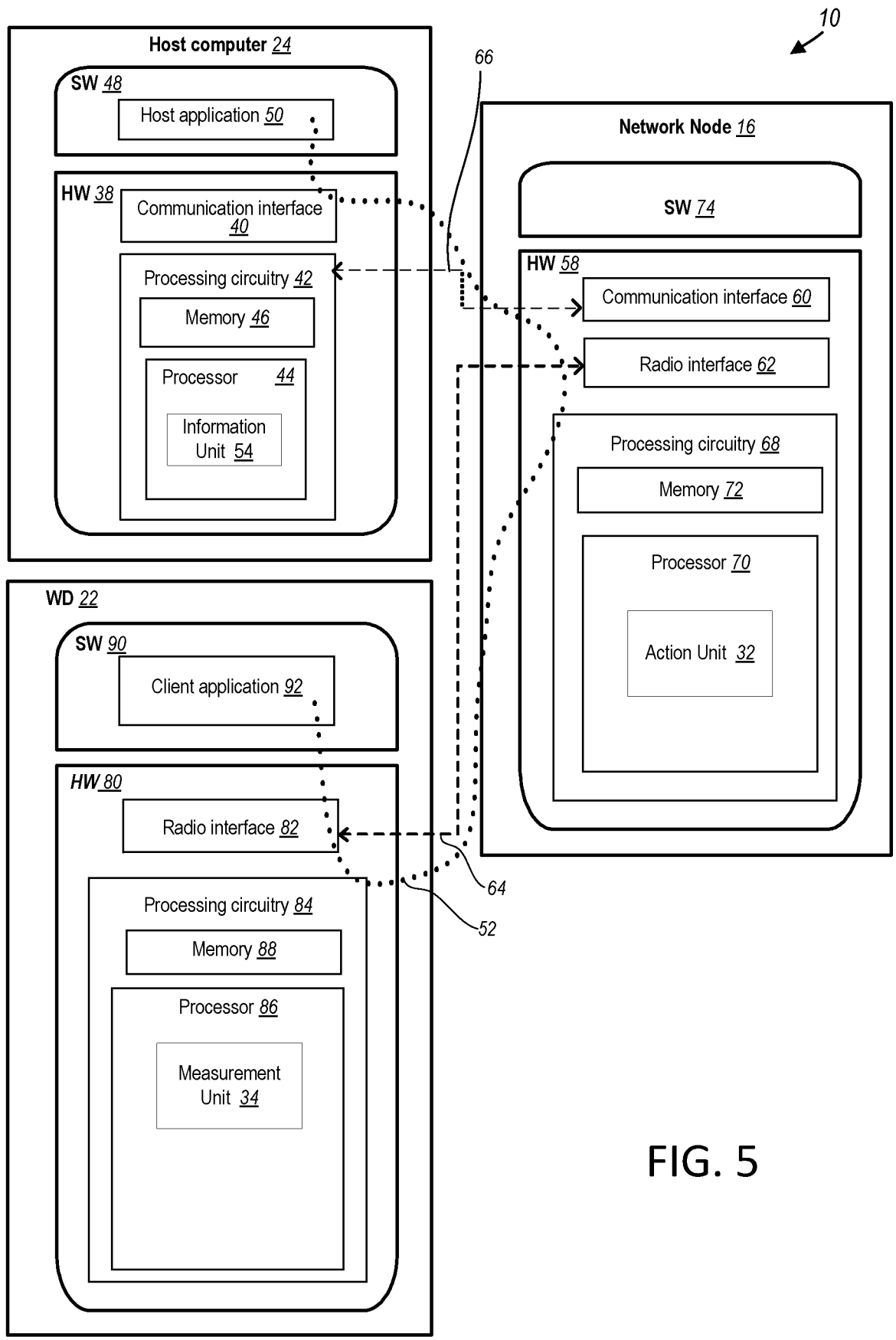
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular, empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as action unit 32, and measurement unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
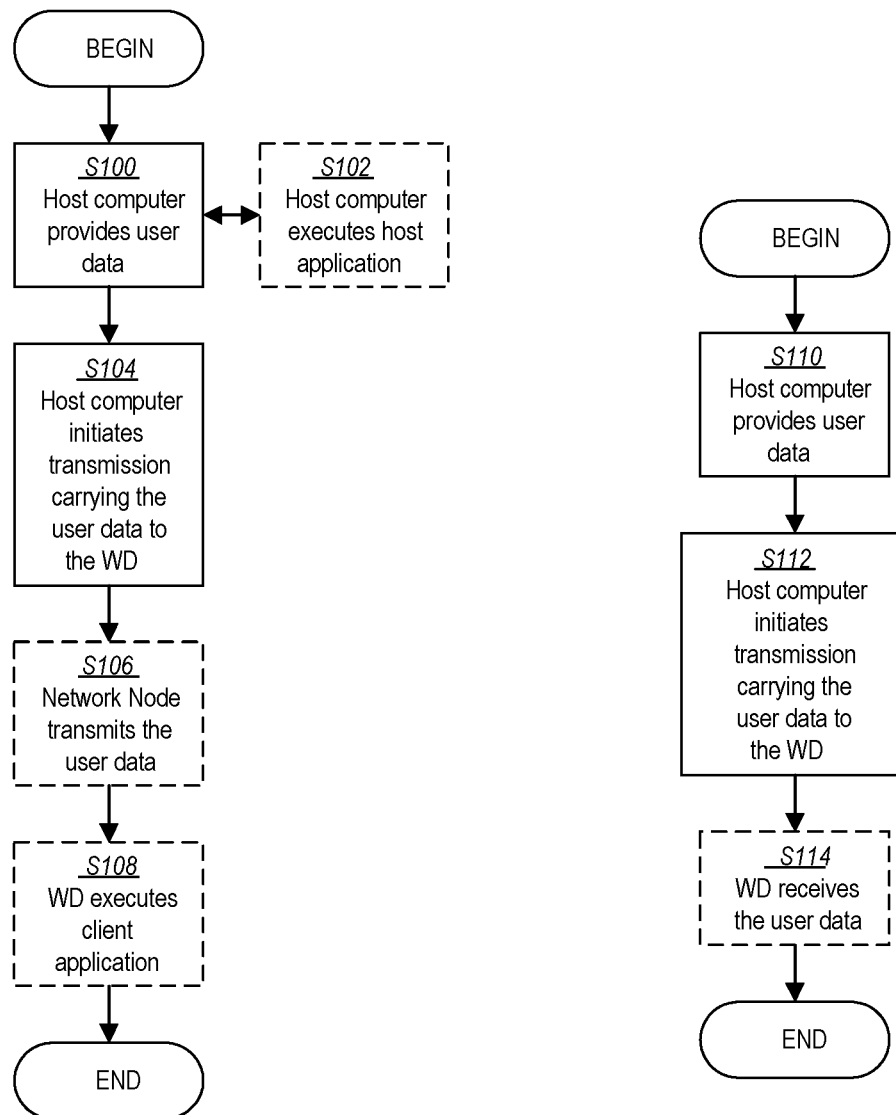
FIG. 6 is a flowchart illustrating example methods implemented in a communication system including a host computer, a network node and a wireless device for executing a client application at a wireless device according to some embodiments of the present disclosure.
FIG. 7 is a flowchart illustrating example methods implemented in a communication system including a host computer, a network node and a wireless device for receiving user data at a wireless device according to some embodiments of the present disclosure.

FIG. 6 is a flowchart illustrating an example method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
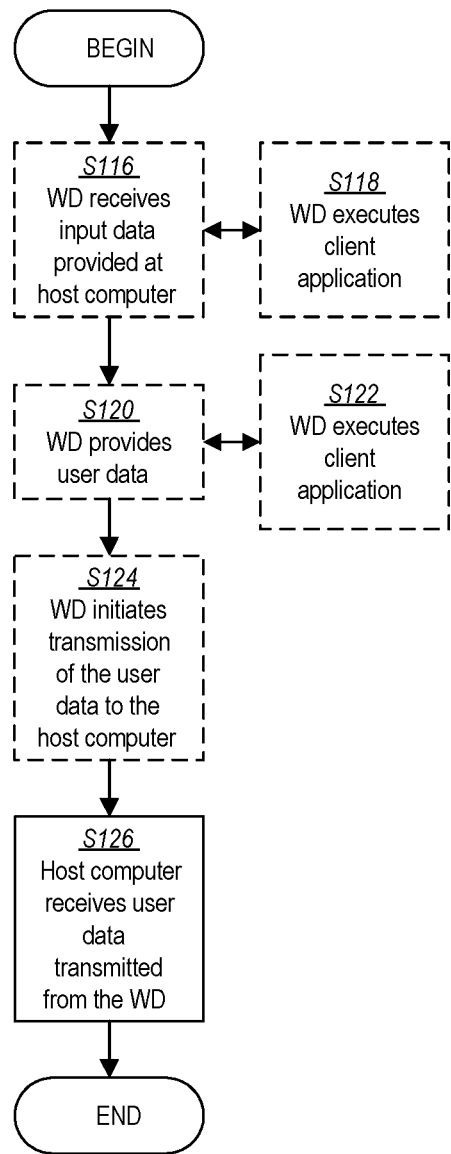
FIG. 8 is a flowchart illustrating example methods implemented in a communication system including a host computer, a network node and a wireless device for receiving user data from the wireless device at a host computer according to some embodiments of the present disclosure.

FIG. 8 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
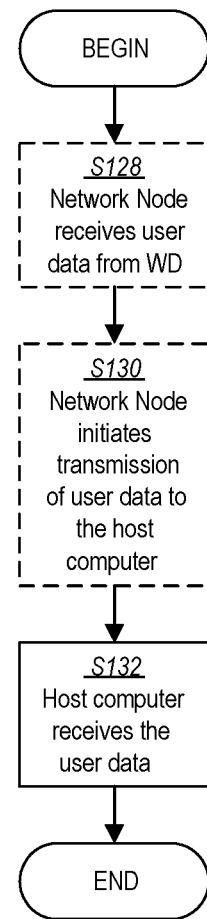
FIG. 9 is a flowchart illustrating example methods implemented in a communication system including a host computer, a network node and a wireless device for receiving user data at a host computer according to some embodiments of the present disclosure.

FIG. 9 is a flowchart illustrating an example method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
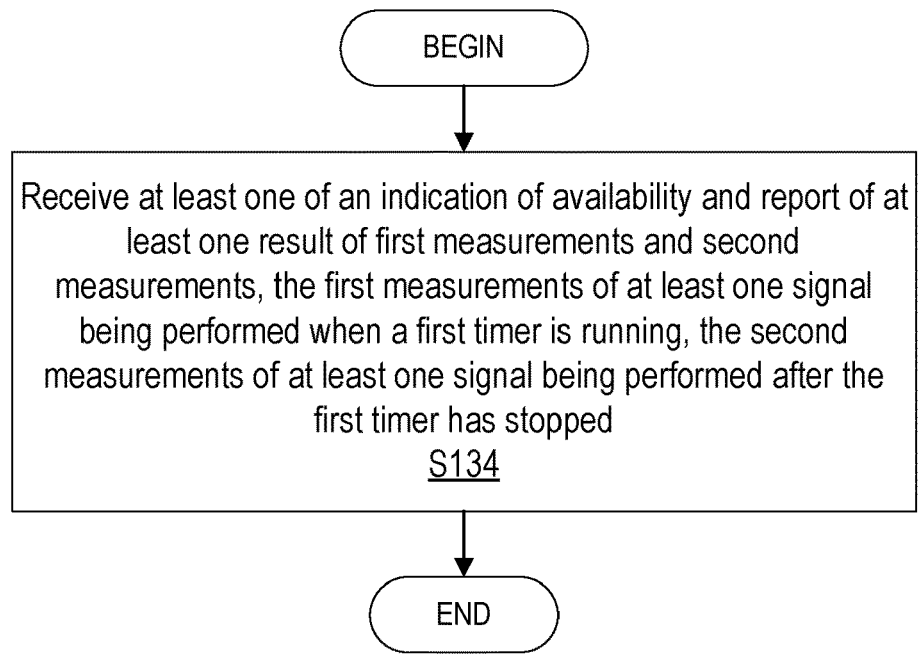
FIG. 10 is a flowchart of an example process in a network node according to some embodiments of the present disclosure.

FIG. 10 is a flowchart of an example process in a network node 16 according to one or more embodiments of the present disclosure. One or more Blocks and/or functions performed by network node 16 may be performed by one or more elements of network node 16 such as by action unit 32 in processing circuitry 68, processor 70, radio interface 62, etc. In one or more embodiments, network node 16 such as via one or more of processing circuitry 68, processor 70, communication interface 60 and radio interface 62 is configured to receive (Block S134) at least one of an indication of availability and report of at least one result of first measurements and second measurements where the first measurements of at least one signal is performed when a first timer is running and the second measurements of at least one signal is performed after the first timer has stopped, as described herein.

According to one or more embodiments, the first measurements correspond to measurement performed while meeting a first performance target where the first performance target includes at least one requirement of at least one of: an accuracy requirement, measurement time or period, evaluation time or period, a number of samples, a sampling periodicity and radio conditions, as described herein. According to one or more embodiments, the second measurements corresponds to measurements performed while meeting a second performance target, the second performance target having at least one reduced requirement when compared to at least one requirement of the first performance target. According to one or more embodiments, processing circuitry 68 and/or radio interface 62 is further configured to determine at least one of when at least one of the first and second measurements were performed and whether at least one of the performance targets were met, as described herein.

Figure 11:
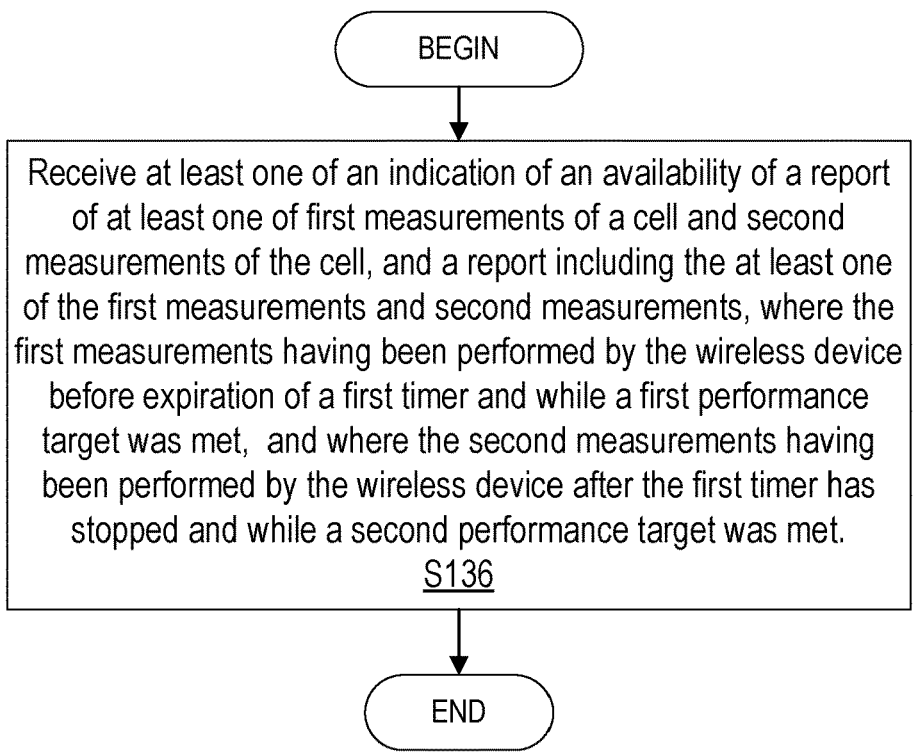
FIG. 11 is a flowchart of another example process in a network node according to some embodiments of the present disclosure.

FIG. 11 is a flowchart of another example process in a network node 16 according to one or more embodiments of the present disclosure. One or more Blocks and/or functions performed by network node 16 may be performed by one or more elements of network node 16 such as by action unit 32 in processing circuitry 68, processor 70, radio interface 62, etc. In one or more embodiments, network node 16 such as via one or more of processing circuitry 68, processor 70, communication interface 60 and radio interface 62 is configured to receive (Block S136) at least one of an indication of an availability of a report of at least one of first measurements of a cell and second measurements of the cell, and a report including the at least one of the first measurements and second measurements, where the first measurements having been performed by the wireless device 22 before expiration of a first timer and while a first performance target was met, and where the second measurements having been performed by the wireless device 22 after the first timer has stopped and while a second performance target was met, as described herein.

According to one or more embodiments, the first measurements and second measurements are included in the report based at least in part on an elapsed time from when at least one of the first measurements and second measurements were performed, as described herein. According to one or more embodiments, the second performance target is less stringent than the first performance target. According to one or more embodiments, the second performance target that is less stringent than the first performance target corresponds to one of: at least one of less carriers, less cells and less beams to measure at a time compared to the first performance target; less frequent sampling compared to the first performance target; less accurate measurements compared to the first performance target; and greater measurement period compared to the first performance target.

According to one or more embodiments, the report indicates when the second measurements were performed. According to one or more embodiments, the first performance target and the second performance target correspond to at least one requirement of a same type. According to one or more embodiments, the at least one requirement of the same type includes at least one of an accuracy requirement, measurement period requirement, evaluation period requirement, a number of samples requirement, sampling periodicity requirement and radio condition requirement.

According to one or more embodiments, the first measurements and the second measurements of a cell includes at least one measurement on at least one of: at least one beam and at least one transmit direction of the cell. According to one or more embodiments, the performed second measurements of the cell includes at least one of: completing the second measurements after the first timer has stopped; taking all measurement samples after the first timer has stopped; and taking at least one measurement before the first timer has stopped and at least one measurement sample after the first timer has stopped. According to one or more embodiments, the stopping of the first timer corresponds to an expiration of the first timer, and where the second measurements were performed at least one of: before expiration of a second timer different from the first timer; and within a predefined time period after the first time stopped. According to one or more embodiments, the first and second measurements are performed by the wireless device 22 on the same type of signal of the cell.

Figure 12:
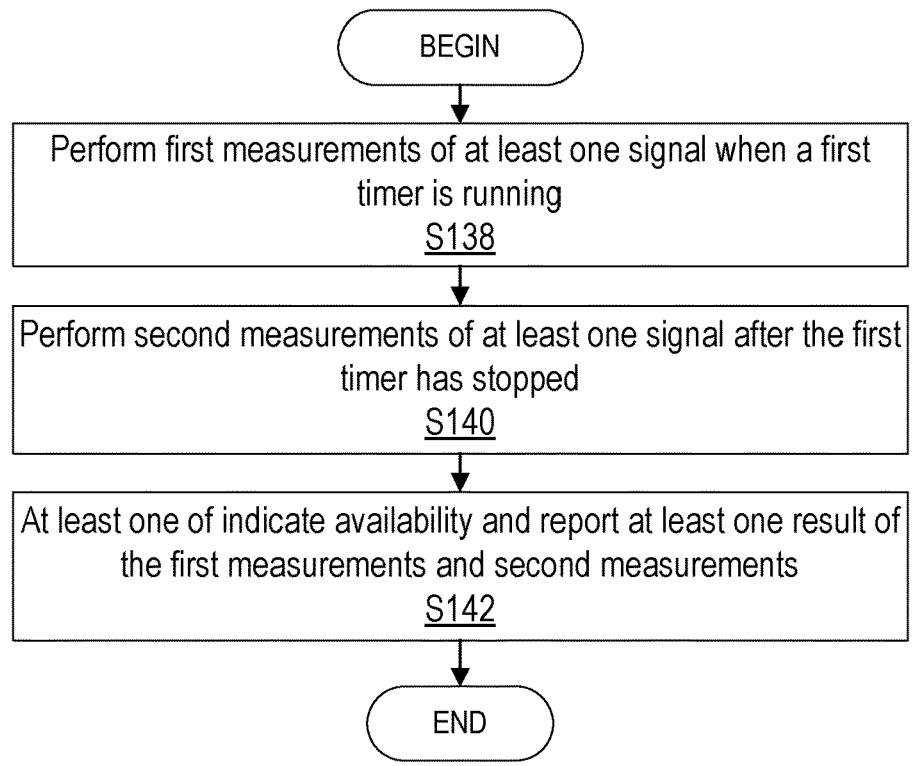
FIG. 12 is a flowchart of an example process in a wireless device according to some embodiments of the present disclosure.

FIG. 12 is a flowchart of an exemplary process in a wireless device 22 according to some embodiments of the present disclosure. One or more Blocks and/or functions performed by wireless device 22 may be performed by one or more elements of wireless device 22 such as by measurement unit 34 in processing circuitry 84, processor 86, radio interface 82, etc. In one or more embodiments, wireless device 22 such as via one or more of processing circuitry 84, processor 86 and radio interface 82 is configured to perform (Block S138) first measurements of at least one signal when a first timer is running, as described herein. In one or more embodiments, wireless device 22 such as via one or more of processing circuitry 84, processor 86 and radio interface 82 is configured to perform (Block S140) second measurements of at least one signal after the first timer has stopped, as described herein. In one or more embodiments, wireless device 22 such as via one or more of processing circuitry 84, processor 86 and radio interface 82 is configured to (Block S142) at least one of indicate availability and report at least one result of the first measurements and second measurements, as described herein.

According to one or more embodiments, the first measurements are performed while meeting a first performance target, the first performance target includes at least one requirement of at least one of: an accuracy requirement, measurement time or period, evaluation time or period, a number of samples, a sampling periodicity and radio conditions, as described herein. According to one or embodiments, the second measurements are performed while meeting a second performance target, the second performance target having at least one reduced requirement when compared to at least one requirement of the first performance target, as described herein. According to one or more embodiments, the at least one of the indicating availability and reporting at least one result of the first measurements and second measurements indicates at least one of when at least one of the first and second measurements were performed and whether at least one of the performance targets were met, as described herein.

Figure 13:
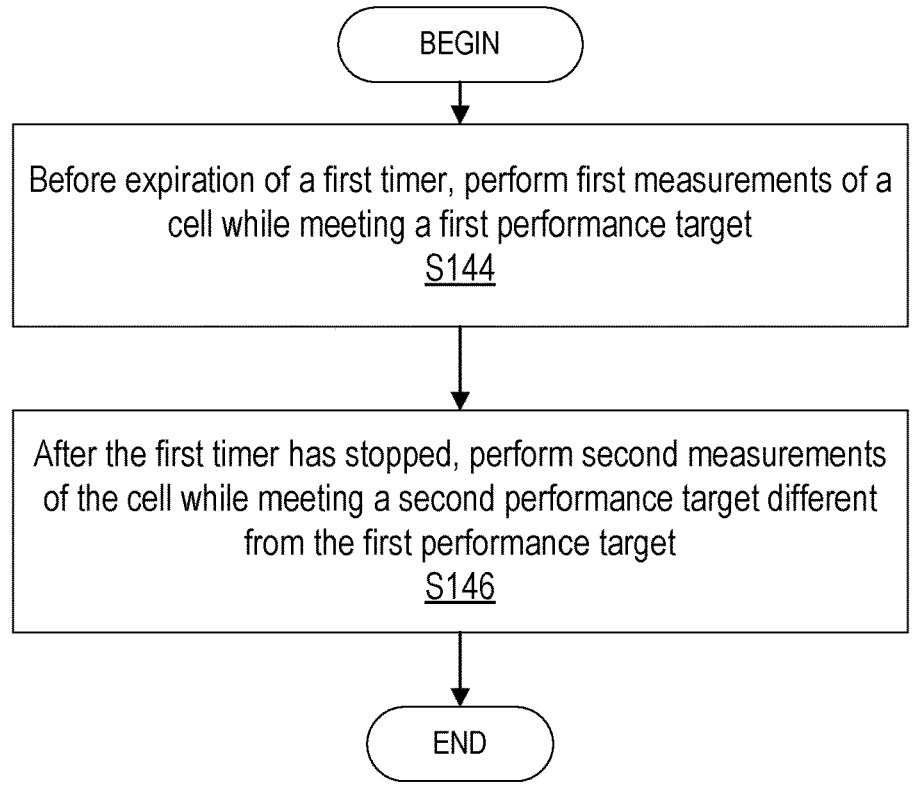
FIG. 13 is a flowchart of another example process in a wireless device according to some embodiments of the present disclosure.

FIG. 13 is a flowchart of another example process in a wireless device 22 according to some embodiments of the present disclosure. One or more Blocks and/or functions performed by wireless device 22 may be performed by one or more elements of wireless device 22 such as by measurement unit 34 in processing circuitry 84, processor 86, radio interface 82, etc. In one or more embodiments, wireless device 22 such as via one or more of processing circuitry 84, processor 86 and radio interface 82 is configured to, before expiration of a first timer, perform (Block S144) first measurements of a cell while meeting a first performance target, as described herein. In one or more embodiments, wireless device 22 such as via one or more of processing circuitry 84, processor 86 and radio interface 82 is configured to, after the first timer has stopped, perform (Block S146) second measurements of the cell while meeting a second performance target different from the first performance target, as described herein.

According to one or more embodiments, the wireless device 22 is further configured to at least one of: indicate an availability of a report of at least one of the first measurements and second measurements; and transmit the report of the at least one of the first measurements and second measurements. According to one or more embodiments, the wireless device 22 is further configured to determine at least one of the first measurements and second measurements to include in the report based at least in part on an elapsed time from when at least one of the first measurements and second measurements were performed. According to one or more embodiments, the report indicates when the second measurements were performed.

According to one or more embodiments, the second performance target is less stringent than the first performance target. According to one or more embodiments, the second performance target that is less stringent than the first performance target corresponds to one of: at least one of less carriers, less cells and less beams to measure at a time compared to the first performance target; less frequent sampling compared to the first performance target; less accurate measurements compared to the first performance target; and greater measurement period compared to the first performance target. According to one or more embodiments, the first performance target and the second performance target correspond to at least one requirement of one of a same type of signal and based on the same type of signal.

According to one or more embodiments, the at least one requirement of the same type includes at least one of an accuracy requirement, measurement period requirement, evaluation period requirement, a number of samples requirement, sampling periodicity requirement and radio condition requirement. According to one or more embodiments, the first measurements and the second measurements of the cell includes at least one measurement on at least one of: at least one beam and at least one transmit direction of the cell. According to one or more embodiments, performing of the second measurements of the cell includes at least one of: completing the second measurements after the first timer has stopped; taking all measurement samples after the first timer has stopped; and taking at least one measurement before the first timer has stopped and at least one measurement sample after the first timer has stopped.

According to one or more embodiments, the stopping of the first timer corresponds to an expiration of the first timer; and the second measurements being performed at least one of: before expiration of a second timer different from the first timer; and within a predefined time period after the first timer stopped. According to one or more embodiments, the first and second measurements are performed on the same type of signal of the cell.

Having generally described arrangements for procedures for measurements and/or reporting such as in early measurement reporting, details for these arrangements, functions and processes are provided as follows, and which may be implemented by the network node 16, wireless device 22 and/or host computer 24.

Embodiments provide procedures for measurements and/or reporting such as in early measurement reporting.

Methods in the Wireless Device 22

Timer-adaptive procedure for EMR measurement and reporting One purpose for EMR measurements may be to enable fast multi-carrier configuration for the wireless device 22, therefore it may be important that up-to-date measurements which reflect the most recent wireless device radio conditions are reported.

An EMR measurement may include one or more of a cell or beam measurement results, e.g., a power based measurement (similar to RSRP, RSRQ, SINR, SNR, Es/IoT, etc.), a timing measurement (similar to RTT, Rx-Tx, ToA), cell index or PCI or beam index (such as best cell/beam index or set of cells/beams measured to be above a threshold), etc.

According to a first embodiment, a wireless device 22 such as via one or more of processing circuitry 84, processor 86, radio interface 82, measurement unit 34, etc., is configured with a first timer for EMR (e.g., T331, i.e., a time of well known timer), and:
- performs such as via one or more of processing circuitry 84, processor 86, radio interface 82, measurement unit 34, etc., first EMR measurements on a cell or beam during the time (i.e., before the expiration of a time period/timer) or timer period T1 when the first timer is running (T1 may correspond to the duration of the first timer), while meeting a first performance target,
- performs such as via one or more of processing circuitry 84, processor 86, radio interface 82, measurement unit 34, etc., second EMR measurements on a cell or beam during a time interval which is after the first timer has stopped or expired (e.g., at least one of: during time T2, pre-defined or configurable by the network node 16, controlled by a second timer), while meeting a second performance target,
  - in one example, T2 may follow immediately after T1 or at the earliest availability instance after T1 of signals necessary for the second measurements
  - in another example, T2 does not follow immediately after T1 but may be started based on a pre-defined rule and/or configuration by a network node 16
  - in yet another example, the wireless device 22 determines the reporting time and, in addition to the first EMR measurements, performs also second EMR measurements during T2 before the determined reporting time, to enable "fresh" EMR measurements and/or
- indicates such as via one or more of processing circuitry 84, processor 86, radio interface 82, measurement unit 34, etc., availability and/or reports at least one result of the first and the second EMR measurements.

A performance target may include and/or correspond to one or more requirements, e.g., accuracy requirement, measurement time or period, evaluation time or period, number of samples and sampling periodicity, radio conditions or side conditions.

In one example, the performing of the first EMR measurements such as via one or more of processing circuitry 84, processor 86, radio interface 82, measurement unit 34, etc., may further include storing such as via one or more of processing circuitry 84, processor 86, radio interface 82, measurement unit 34, etc., in memory 88 the first EMR measurements for a certain amount of time after T1, e.g., for a time T3.

In another example, performing such as via one or more of processing circuitry 84, processor 86, radio interface 82, measurement unit 34, etc., the EMR measurement during T2 may further include performing the EMR measurement selectively, for example, at least one of:
- performing such as via one or more of processing circuitry 84, processor 86, radio interface 82, measurement unit 34, etc., on a subset of carrier frequencies and/or cells/beams which were originally configured for EMR, on carrier frequencies overlapping with carrier frequencies for mobility measurements, on most "promising" or N best (with best performance, for example,) carrier frequencies and/or cells/beams, on carrier frequencies and cells/beams with one or more conditions (e.g., RSRP, RSRQ, SINR, Es/IoT) above a threshold,
- performing such as via one or more of processing circuitry 84, processor 86, radio interface 82, measurement unit 34, etc., the second EMR measurements, if cell reselection occurred after the first EMR measurements started,
- performing such as via one or more of processing circuitry 84, processor 86, radio interface 82, measurement unit 34, etc., the second EMR measurements if not possible to report the first EMR measurements or the reporting of the first EMR measurements is delayed, etc., The decision on whether and how to selectively perform second EMR measurements may be performed by the wireless device 22 such as via one or more of processing circuitry 84, processor 86, radio interface 82, measurement unit 34, etc.

In another example, the second performance target is more relaxed (i.e., less strict and/or have less requirements and/or low threshold requirements, etc.) when compared to the first performance target, at least in one requirement of the same type (e.g., at least one of: fewer carriers and/or cells and/or beams to measure during the same time, more sparce sampling, less accurate measurement, longer measurement period, etc.). For example, the measurement time (e.g., cell detection or cell search time (Ts2)) for the second performance target is longer than the measurement time (e.g., cell detection or cell search time (Ts1)) for the first performance target. As an example, Ts2=25*$T_{DRX}$ and Ts1=20*$T_{DRX}$, where $T_{DRX}$ is the DRX cycle length e.g., $T_{DRX}$=1.28 seconds. In another example, the measurement accuracy (e.g., RSRP accuracy (A2)) for the second performance target is worse than the measurement accuracy (e.g., RSRP accuracy (A1)) for the first performance target. A2 is considered to be worse than A1 if the former has a larger deviation with respect to a reference measurement value (e.g., ideal RSRP measured). For example, A2=±7 dB is considered to be worse than A1=±5 dB. In another example, where the performance target is a side condition, the wireless device 22 may be required to perform such as via one or more of processing circuitry 84, processor 86, radio interface 82, measurement unit 34, etc., the first EMR measurements of a certain accuracy in first side conditions, while it is required to perform such as via one or more of processing circuitry 84, processor 86, radio interface 82, measurement unit 34, etc., the second EMR measurements of the same quality but in more relaxed side conditions such at a higher Es/Iot and/or higher RSRP, etc.

In yet another example, the indicating of availability and/or reporting is further indicative of whether the EMR measurement was performed during T1 or during T2 and/or meeting the first performance target or the second performance target (the indication may be implicit or explicit).

In yet another example, the indicating of availability and/or reporting such as via one or more of processing circuitry 84, processor 86, radio interface 82, measurement unit 34, etc., includes selectively including the first EMR measurements, for example, at least one of:
    based on the time T4 elapsed (i.e., expired or stopped) since the first EMR measurements were completed, e.g., including when T4<threshold or T4<=T3, otherwise not including, or
    including the first EMR measurements if T2>threshold and/or the second≤EMR measurements are not available for the same carrier frequency and/or cell/beam, otherwise not including the first EMR measurements.

In yet another example, the indicating of availability and/or reporting further includes a combined EMR measurement result for the first and the second EMR measurements (e.g., a function of both, minimum of the two, maximum of the two, average, etc.), together with the first EMR measurement result or with an indication that this is the combined EMR measurement based on both the first and the second EMR measurements.

In yet another example, the first performance target for the EMR measurements is met by the wireless device 22 provided that T1 is below or equal to a certain threshold (Td) (e.g., Td=X % of maximum value of T331, e.g., T1≤150 s corresponding to 50% of the maximum value of T331). Otherwise when T1>Td then the wireless device 22 is allowed to meet the second performance target for the EMR measurements. The value of Td may depend at least in part on the amount of measurements configured for performing measurements (e.g., at least one of: number of carriers configured for performing EMR measurements and/or number of carriers configured for performing measurements for cell reselection etc.). For example, if the amount of measurements configured for performing EMR measurements is above threshold then Td is smaller compared to the case when amount of measurements configured for performing EMR measurements is equal to or below the threshold.

Timer-Adaptive Procedure for EMR Measurement and Reporting Further Accounting for the Cell/Beam Known or Unknown Status According to another embodiment such as a second embodiment, the wireless device 22 such as via one or more of processing circuitry 84, processor 86, radio interface 82, measurement unit 34, etc., is configured with a first timer for EMR (e.g., T331) and may perform the following steps (the order of steps may be different in different implementations or scenarios):
    performs such as via one or more of processing circuitry 84, processor 86, radio interface 82, measurement unit 34, etc., first EMR measurements on a cell or beam (associated with a network node 16) during the time T1 when the first timer is running and the cell and/or beam are known, while meeting a first performance target,
    performs such as via one or more of processing circuitry 84, processor 86, radio interface 82, measurement unit 34, etc., second EMR measurements on a cell or beam after the timer has stopped (e.g., at least one of: during time T2, pre-defined or configurable by the network node 16, controlled by a second timer etc.) and the cell and/or beam (associated with a network node 16) are unknown, while meeting a second performance target, similar to examples in the "Timer-adaptive procedure for EMR measurement and reporting" section, T2 may or may not follow immediately after T1
    in some examples, the wireless device 22 may such as via one or more of processing circuitry 84, processor 86, radio interface 82, measurement unit 34, etc., further do/perform at least one of:
        perform such as via one or more of processing circuitry 84, processor 86, radio interface 82, measurement unit 34, etc., third EMR measurements on a cell or beam during the time when the first timer is not running but the cell and/or beam are known, while meeting a third performance target,
        perform such as via one or more of processing circuitry 84, processor 86, radio interface 82, measurement unit 34, etc., fourth EMR measurements on a cell or beam during the time when the first timer is running but the cell and/or beam are unknown, while meeting a fourth performance target.
    indicates such as via one or more of processing circuitry 84, processor 86, radio interface 82, measurement unit 34, etc., availability and/or reports at least one result of the first and the fourth EMR measurements
    in some examples, the wireless device 22 may also indicate such as via one or more of processing circuitry 84, processor 86, radio interface 82, measurement unit 34, etc., availability and/or report at least one result of the second and the third EMR measurements.

In one or more examples such as a special example, the third performance target may be the same as the first or second performance target. In one or more examples such as another special example, the fourth performance target may be the same as the first or second performance target. In one or more examples, the fourth performance target may be more relaxed (where a "relaxed" performed target is described above with respect to the first and/or second performance targets) than the first performance target. In one or more examples, the third performance target may be more relaxed than the second performance target. In one or more examples, when the cell is or becomes unknown and the wireless device 22 such as via one or more of processing circuitry 84, processor 86, radio interface 82, measurement unit 34, etc., intends to further measure the cell (i.e., cell signal(s)) for EMR purpose, the corresponding performance target includes that the wireless device 22 detects the cell to make the cell known prior to measuring, which may not be needed while the cell and/or beam are known and thus requires extra time.

The examples described for the first embodiment are also applicable for the second embodiment. These examples can further be extended to the third and the fourth EMR measurements in the second embodiment, e.g., the examples described for the first and the second EMR measurements with more relaxed second performance target can be interpreted as if it is for the first and the fourth EMR measurements with more relaxed fourth performance target, etc.

Methods in a Radio Network Node 16

According to the third embodiment, a network node 16 such as via one or more of processing circuitry 68, processor 70, radio interface 62, action unit 32, etc., determines the performance target (e.g., the first, second, third, or fourth performance targets as classified in the wireless device 22 embodiments described above) applicable for one or more results of EMR measurements indicated as available or reported by the wireless device 22 (e.g., based on pre-defined rule such as described above in the wireless device 22 embodiments or standard, implicit or explicit indication by the wireless device 22 in the measurement availability indication or with the measurement report, or via a time stamp associated with the measurement).

The network node 16 may such as via one or more of processing circuitry 68, processor 70, radio interface 62, action unit 32, etc., further determine the time deltaT elapsed since the first timer associated with the EMR measurement (e.g., T331 timer) has expired.

The time deltaT may further account for the uncertainty about when the first timer started exactly (which may be delayed, e.g., due to protocol delays, etc.).

The network node 16 may such as via one or more of processing circuitry 68, processor 70, radio interface 62, action unit 32, etc., take different actions for the received indication or EMR measurement, depending on the determined corresponding applicable performance target and/or deltaT. For example, an action may comprise any one or more of: requesting or deciding to not request the available measurement (e.g., not request when deltaT is above a threshold and/or the applicable performance target is worse than desired), configuring or activating a specific CA configuration for the wireless device based on the measurement provided the determined performance target is at least at the desired level or better, etc.

SOME EXAMPLES

Example A1. A network node 16 configured to communicate with a wireless device 22 (WD 22), the network node 16 configured to, and/or comprising a radio interface 62 and/or comprising processing circuitry 68 configured to:
receive at least one of an indication of availability and report of at least one result of first measurements and second measurements, the first measurements of at least one signal being performed when a first timer is running, the second measurements of at least one signal being performed after the first timer has stopped.

Example A2. The network node 16 of Example A1, wherein the first measurements correspond to measurements performed while meeting a first performance target, the first performance target includes at least one requirement of at least one of: an accuracy requirement, measurement time or period, evaluation time or period, a number of samples, a sampling periodicity and radio conditions.

Example A3. The network node 16 of Example A2, wherein the second measurements corresponds to measurements performed while meeting a second performance target, the second performance target having at least one reduced requirement when compared to at least one requirement of the first performance target.

Example A4. The network node 16 of Example A3, wherein the processing circuitry 68 and/or radio interface 62 is further configured to determine at least one of when at least one of the first and second measurements were performed and whether at least one of the performance targets were met.

Example B1. A method implemented in a network node 16, the method comprising receiving at least one of an indication of availability and report of at least one result of first measurements and second measurements, the first measurements of at least one signal being performed when a first timer is running, the second measurements of at least one signal being performed after the first timer has stopped.

Example B2. The method of Example B1, wherein the first measurements correspond to measurements performed while meeting a first performance target, the first performance target includes at least one requirement of at least one of: an accuracy requirement, measurement time or period, evaluation time or period, a number of samples, a sampling periodicity and radio conditions.

Example B3. The method of Example B2, wherein the second measurements corresponds to measurements performed while meeting a second performance target, the second performance target having at least one reduced requirement when compared to at least one requirement of the first performance target.

Example B4. The method of Example B3, further comprising determining at least one of when at least one of the first and second measurements were performed and whether at least one of the performance targets were met.

Example C1. A wireless device 22 (WD 22) configured to communicate with a network node 16, the WD 22 configured to, and/or comprising a radio interface 82 and/or processing circuitry 84 configured to:
perform first measurements of at least one signal when a first timer is running;
perform second measurements of at least one signal after the first timer has stopped; and at least one of indicate availability and report at least one result of the first measurements and second measurements.

Example C2. The WD 22 of Example C1, wherein the first measurements are performed while meeting a first performance target, the first performance target includes at least one requirement of at least one of: an accuracy requirement, measurement time or period, evaluation time or period, a number of samples, a sampling periodicity and radio conditions.

Example C3. The WD 22 of Example C2, wherein the second measurements are performed while meeting a second performance target, the second performance target having at least one reduced requirement when compared to at least one requirement of the first performance target.

Example C4. The WD 22 of Example C3, wherein the at least one of the indicating availability and reporting at least one result of the first measurements and second measurements indicates at least one of when at least one of the first and second measurements were performed and whether at least one of the performance targets were met.

Example D1. A method implemented in a wireless device 22 (WD 22), the method comprising:
  performing first measurements of at least one signal when a first timer is running;
  performing second measurements of at least one signal after the first timer has stopped; and
  at least one of indicating availability and reporting at least one result of the first measurements and second measurements Example D2. The method of Example D1, wherein the first measurements are performed while meeting a first performance target, the first performance target includes at least one requirement of at least one of: an accuracy requirement, measurement time or period, evaluation time or period, a number of samples, a sampling periodicity and radio conditions.

Example D3. The method of Example D2, wherein the second measurements are performed while meeting a second performance target, the second performance target having at least one reduced requirement when compared to at least one requirement of the first performance target.

Example D4. The method of Example D3, wherein the at least one of the indicating availability and reporting at least one result of the first measurements and second measurements indicates at least one of when at least one of the first and second measurements were performed and whether at least one of the performance targets were met.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| ACK | Acknowledged |
| BS | Base station |
| BWP | Bandwidth part |
| CE | Control element |
| CORESET | Control resource set |
| COT | Channel Occupancy Time |
| CRS | Cell-specific reference signals |
| CSI | Channel state information |
| CSI-RS | Channel state information reference signals |
| DCI | Downlink control information |
| DL | Downlink |

-continued

| Abbreviation | Explanation |
| --- | --- |
| DRS | Discovery reference signals |
| eLAA | Enhanced LAA |
| EMR | Early Measurement Reporting |
| FBE | Frame Based Equipment |
| FDD | Frequency division duplex |
| FR1 | Frequency range 1 |
| FR2 | Frequency range 2 |
| GC-PDCCH | Group-common PDCCH |
| gNB | Next generation Node B |
| HARQ | Hybrid automatic repeat request |
| HSPA | High speed packet access |
| LAA | License assisted access |
| LAA | Licensed-Assisted Access |
| LBE | Load Based Equipment |
| LBT | Listen Before Talk |
| LTE | Long term evolution |
| MAC | Medium access control |
| MCOT | Maximum COT |
| NACK | Not acknowledged |
| NR | New radio |
| NR-U | NR unlicensed |
| OSI | Other system information |
| PBCH | Physical broadcast channel |
| PDCCH | Physical downlink control channel |
| PDSCH | Physical downlink shared channel |
| PSS | Primary synchronization signal |
| PUCCH | Physical uplink control channel |
| PUSCH | Physical uplink shared channel |
| QCI | Quasi co-location |
| RACH | Rando access channel |
| RAT | Radio access technology |
| RMSI | Remaining minimum system information |
| RRC | Radio resource control |
| SCH | Shared channel |
| SNR | Signal to noise ratio |
| SRS | Sounding reference signal |
| SSS | Secondary synchronization signal |
| TCI | Transmission configuration indicator |
| TDD | Time division duplex |
| UCI | Uplink control information |
| UE | User equipment |
| UL | Uplink |
| WCDMA | Wide-band code division multiple access |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device configured to communicate with a network node under multi-carrier operation, the wireless device configured to:
   while in a Radio Resource Control, RRC-IDLE state or RRC-INACTIVE state and during running of a first timer, perform first early measurement reporting, EMR, measurements of a cell while meeting a first performance target; and
   after the first timer has stopped or expired and prior to an EMR reporting, perform second EMR measurements of the cell while:
      meeting a second performance target that has less accurate measurements compared to the first performance target.

2. The wireless device of claim 1, wherein the wireless device is further configured to at least one of:
   indicate an availability of a report of at least one of the first EMR measurements and second EMR measurements; and
   transmit the report of the at least one of the first EMR measurements and second EMR measurements.

3. The wireless device of claim 2, wherein the wireless device is further configured to determine at least one of the first EMR measurements and second EMR measurements to include in the report based at least in part on an elapsed time from when at least one of the first EMR measurements and second EMR measurements were performed.

4. The wireless device of claim 2, wherein the report indicates when the second EMR measurements were performed.

5. The wireless device of claim 1, wherein the first performance target and the second performance target correspond to at least one requirement of one of a same type of signal and based on the same type of signal.

6. The wireless device of claim 5, wherein the at least one requirement of the same type includes at least one of measurement period requirement, evaluation period requirement, a number of samples requirement, sampling periodicity requirement and radio condition requirement.

7. The wireless device of claim 1, wherein the first EMR measurements and the second EMR measurements of a cell include at least one measurement on at least one of: at least one beam and at least one transmit direction of the cell.

8. The wireless device of claim 1, wherein performing of the second EMR measurements of the cell includes at least one of:
   completing the second EMR measurements after the first timer has stopped;
   taking all measurement samples after the first timer has stopped; and
   taking at least one measurement before the first timer has stopped and at least one measurement sample after the first timer has stopped.

9. The wireless device of claim 1, wherein the first timer has expired; and
   the second EMR measurements being performed at least one of:
      before expiration of a second timer different from the first timer; and
      within a predefined time period after the first timer stopped.

10. The wireless device of claim 1, wherein the first and second EMR measurements are performed on the same type of signal of the cell.

11. A network node configured to communicate with a wireless device under multi-carrier operation, the network node configured to:
   receive at least one of:
      an indication of an availability of a report of at least one of first early measurement report, EMR, measurements of a cell and second EMR measurements of the cell;
      a report including the at least one of the first EMR measurements and second EMR measurements;
   the first EMR measurements having been performed by the wireless device while in a Radio Resource Control, RRC-IDLE state or RRC-INACTIVE state and during running of a first timer and while a first performance target was met, the second EMR measurements having been performed by the wireless device after the first timer has stopped or expired and prior to an EMR reporting and while a second performance target was met; and
   the second performance target having less accurate measurements compared to the first performance target.

12. The network node of claim 11, wherein the first EMR measurements and second EMR measurements are included in the report based at least in part on an elapsed time from when at least one of the first EMR measurements and second EMR measurements were performed.

13. The network node of claim 11, wherein the report indicates when the second EMR measurements were performed.

14. The network node of claim 11, wherein the first performance target and the second performance target correspond to at least one requirement of a same type.

15. The network node of claim 14, wherein the at least one requirement of the same type includes at least one of measurement period requirement, evaluation period requirement, a number of samples requirement, sampling periodicity requirement and radio condition requirement.

16. The network node of claim 11, wherein the first EMR measurements and the second EMR measurements of a cell includes at least one measurement on at least one of: at least one beam and at least one transmit direction of the cell.

17. The network node of claim 11, wherein the performed second EMR measurements of the cell includes at least one of:
   completing the second EMR measurements after the first timer has stopped;
   taking all measurement samples after the first timer has stopped; and
   taking at least one measurement before the first timer has stopped and at least one measurement sample after the first timer has stopped.

18. The network node of claim 11, wherein the first timer has expired; and
   the second EMR measurements were performed at least one of:
      before expiration of a second timer different from the first timer; and
      within a predefined time period after the first time stopped.

19. The network node of claim 11, wherein the first and second EMR measurements are performed by the wireless device on the same type of signal of the cell.

20. A method implemented by a wireless device that is configured to communicate with a network node under multi-carrier operation, the method comprising:
   while in a Radio Resource Control, RRC-IDLE state or RRC-INACTIVE state and during running of a first timer, performing first early measurement reporting, EMR, measurements of a cell while meeting a first performance target; and
   after the first timer has stopped or expired and prior to an EMR reporting, performing second measurements of the cell while meeting a second performance target that has less accurate measurements compared to the first performance target.

21. The method of claim 20, further comprising at least one of:
   indicating an availability of a report of at least one of the first EMR measurements and second EMR measurements; and
   transmitting the report of the at least one of the first EMR measurements and second EMR measurements.

22. A method implemented by a network node that is configured to communicate with a wireless device under multi-carrier operation, the method comprising:
   receiving at least one of:
      an indication of an availability of a report of at least one of first early measurement report, EMR, measurements of a cell and second EMR measurements of the cell; and
      a report including the at least one of the first EMR measurements and second EMR measurements;
   the first EMR measurements having been performed by the wireless device while in a Radio Resource Control, RRC-IDLE state or RRC-INACTIVE state and during running of a first timer and while a first performance target was met, the second EMR measurements having been performed by the wireless device after the first timer has stopped or expired and prior to an EMR reporting and while a second performance target was met; and
   the second performance target having less accurate measurements compared to the first performance target.

* * * * *